(12) United States Patent
Yamaguchi

(10) Patent No.: US 8,445,397 B2
(45) Date of Patent: May 21, 2013

(54) DIELECTRIC CERAMIC AND LAMINATED CERAMIC CAPACITOR

(75) Inventor: Shinichi Yamaguchi, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 32 days.

(21) Appl. No.: 13/226,540

(22) Filed: Sep. 7, 2011

(65) Prior Publication Data

US 2012/0081836 A1    Apr. 5, 2012

(30) Foreign Application Priority Data

Sep. 30, 2010   (JP) ................. 2010-221935

(51) Int. Cl.
*C04B 35/468* (2006.01)
*H01G 4/06* (2006.01)

(52) U.S. Cl.
USPC .............. 501/139; 501/138; 361/321.4

(58) Field of Classification Search
USPC ................. 501/138, 139; 361/321.4
See application file for complete search history.

(56) References Cited

U.S. PATENT DOCUMENTS

| 7,157,396 B2 * | 1/2007 | Watanabe et al. ............. 501/135 |
| 7,419,927 B2 | 9/2008 | Ito et al. |
| 2012/0147524 A1 * | 6/2012 | Okamoto et al. .......... 361/321.4 |

FOREIGN PATENT DOCUMENTS

| CN | 1760156 A | 4/2006 |
| JP | 2003-165768 A | 6/2003 |
| JP | 2005-281066 A | 10/2005 |
| JP | 2006-036606 A | 2/2006 |
| JP | 2007-197233 A | 8/2007 |

* cited by examiner

*Primary Examiner* — Karl Group
(74) *Attorney, Agent, or Firm* — Dickstein Shapiro LLP

(57) ABSTRACT

A laminated ceramic capacitor which exhibits excellent lifetime characteristics in a high temperature loading test uses a dielectric ceramic constituting the dielectric layers which contains $(Ba_{1-x}Ca_x)TiO_3$ as its main constituent, and contains a parts by mol of Al, b parts by mol of V, c parts by mol of Mg, and d parts by mol of Re with respect to 100 parts by mol of the $(Ba_{1-x}Ca_x)TiO_3$. The Re is at least one metal element selected from among Y, La, Sm, Eu, Gd, Tb, Dy, Ho, Er, Tm, and Yb, and the x, a, b, c, and d respectively satisfy the conditions of $0.050 \leq x \leq 0.150$, $a \geq 0.15$, $0.05 \leq b \leq 0.50$, $c \leq 0.50$, and $d \geq 1.00$.

20 Claims, 1 Drawing Sheet

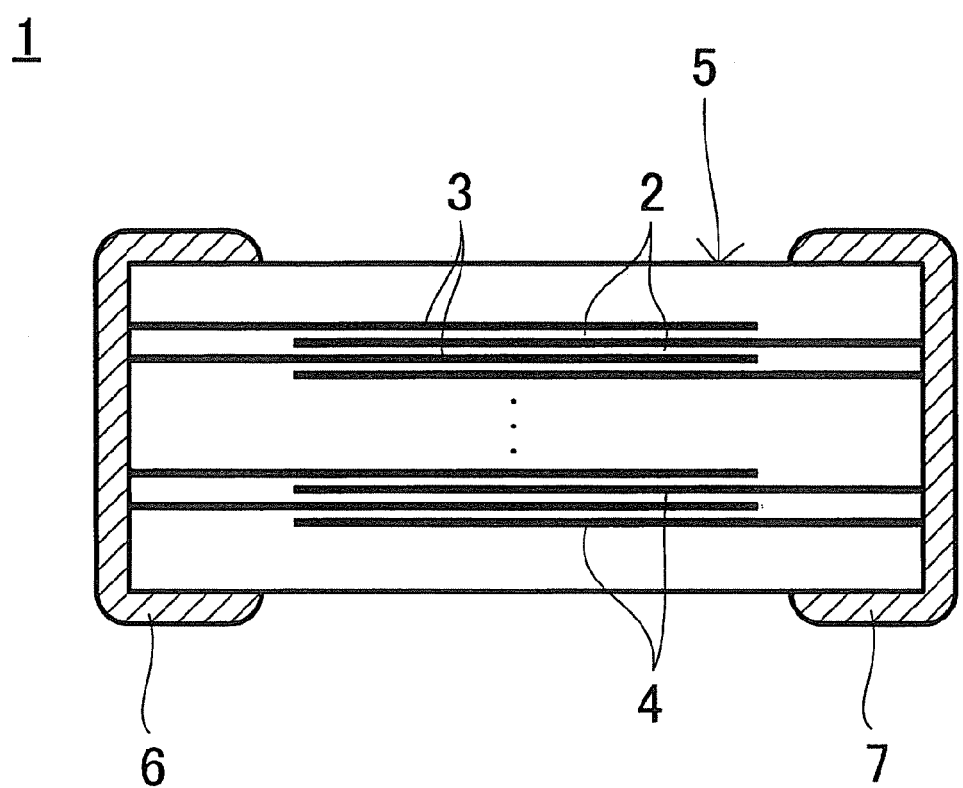

DIELECTRIC CERAMIC AND LAMINATED CERAMIC CAPACITOR

BACKGROUND OF THE INVENTION

1. Field of the Invention

The present invention relates to a dielectric ceramic. In addition, the present invention relates to a laminated ceramic capacitor configured with the use of the dielectric ceramic.

2. Description of the Related Art

A laminated ceramic capacitor, one typical ceramic electronic component, has, for example, a laminated body including a plurality of stacked dielectric layers and a plurality of internal electrodes formed along interfaces between the dielectric layers; and external electrodes formed on the outer surface of the laminated body and electrically connected to the internal electrodes.

In the dielectric ceramic used for constituting the dielectric layers, $BaTiO_3$ based compounds have been used as a main constituent of the dielectric ceramic in order to realize high dielectric constants. In particular, the use of $(Ba, Ca)TiO_3$, a barium titanate with some of Ba substituted with Ca, can achieve high reliability and favorable temperature characteristics of capacitance in some cases.

Extremely severe demands have been made on laminated ceramic capacitors in recent years for a reduction in size and an increase in capacitance. For example, the dielectric layers have been required to have a thickness reduced to on the order of 1 μm. As a result, the intensity of the electric field applied to the dielectric layers has been increasing, thereby leading to an increasingly severe design constraint for ensuring reliability.

As a means for solving the problem described above, for example, Japanese Patent Application Laid-Open No. 2003-165768 proposes the addition of various elements to a dielectric ceramic in predetermined amounts. Specifically, Japanese Patent Application Laid-Open No. 2003-165768 proposes a dielectric ceramic represented by the general formula: $(Ba, Ca_x)_m TiO_3 + \alpha_1 BaO + \alpha_2 CaO + \beta V_2 O_5$, in which $\alpha_1$ and $\alpha_2$, respectively, include cases of $\alpha_1=0$ and $\alpha_1=0$, with $m \geq 0.990$, $0.0001 \leq \beta 0.025$, $0.02 \leq x \leq 0.15$ in the relationship of $1.005 < m + \alpha_1 + \alpha_2 < 1.035$, and the content of a sintering aid present is 0.2 to 5.0 parts by weight with respect to 100 parts by weight of the compound represented by the general formula.

SUMMARY OF THE INVENTION

However, the dielectric ceramic described above has the following problem. More specifically, this dielectric ceramic is likely to increase the variation in grain diameters. Therefore, when this dielectric ceramic is used as dielectric layers which are reduced in thickness to a value on the order of 1 μm for a laminated ceramic capacitor, the lifetime characteristics may be degraded in a high temperature loading test when a high electric field intensity of, for example, 15 kV/mm or more is applied to the laminated ceramic capacitor.

The present invention has been made in view of the problem, and an object of the present invention is to provide a laminated ceramic capacitor which exhibits excellent lifetime characteristics in a high temperature loading test.

A dielectric ceramic according to the present invention contains $(Ba_{1-x}Ca_x)TiO_3$ as its main constituent, and contains a parts by mol of Al, b parts by mol of V, c parts by mol of Mg, and d parts by mol of Re with respect to 100 parts by mol of the $(Ba_{1-x}Ca_x)TiO_3$, where Re is at least one metal element selected from among Y, La, Sm, Eu, Gd, Tb, Dy, Ho, Er, Tm, and Yb, and the x, a, b, c, and d respectively satisfy the conditions of $0.050 \leq x \leq 0.150$, $a \geq 0.15$, $0.05 \leq b \leq 0.50$, $c \leq 0.50$, and $d \geq 1.00$.

In addition, c preferably satisfies the condition of $c < 0.10$ in the dielectric ceramic according to the present invention.

In addition, the dielectric ceramic according to the present invention preferably contains e parts by mol of Mn and f parts by mol of Si with respect to 100 parts by mol of the $(Ba_{1-x}Ca_x)TiO_3$, in which the a, d, e, and f respectively satisfy the conditions of $0.15 \leq a \leq 1.60$, $1.00 \leq d \leq 7.00$, $0.10 \leq e \leq 1.50$, and $0.50 \leq f \leq 2.50$, and the molar ratio of the $(Ba_{1-x}Ca_x)$ to Ti is 0.99 or more and 1.03 or less.

In addition, the present invention is also directed to a laminated ceramic capacitor having a laminated body including a plurality of stacked dielectric layers and a plurality of internal electrodes formed along interfaces between the dielectric layers; and a plurality of external electrodes formed on an outer surface of the laminated body and electrically connected to the internal electrodes, in which the dielectric layers include the dielectric ceramic described above.

In the case of the dielectric ceramic being used for the laminated ceramic capacitor, favorable lifetime characteristics can be achieved in a high temperature loading test, even when high electric field intensity is applied to the laminated ceramic capacitor.

BRIEF DESCRIPTION OF THE DRAWINGS

The sole FIGURE is a cross-sectional view of a laminated ceramic capacitor according to the present invention.

DETAILED DESCRIPTION OF THE INVENTION

An embodiment of the present invention will be described below.

The sole FIGURE is a cross-sectional view of a laminated ceramic capacitor according to the present invention.

The laminated ceramic capacitor 1 includes a laminated body 5. The laminated body 5 includes a plurality of stacked dielectric layers 2 and a plurality of internal electrodes 3 and 4 formed along interfaces between the plurality of dielectric layers 2. The internal electrodes 3 and 4 are formed so as to reach the outer surface of the laminated body 5. Furthermore, the internal electrodes 3 extend to one end surface of the laminated body 5 and the internal electrodes 4 extend to the other end surface of the laminated body 5 are arranged alternately with the ceramic layers 2 interposed therebetween within the laminated body 5. The materials for the internal electrodes 3 and 4 include, for example, a material containing Ni as its main constituent.

External electrodes 6 and 7 are formed on the outer surface of the laminated body 5. In the sole FIGURE, the external electrodes 6 and 7 are formed at least on the respective end surfaces of the laminated body 5 opposed to each other. The external electrode 6 is electrically connected to the internal electrodes 3 on one end surface of the laminated body 5. In addition, the external electrode 7 is electrically connected to the internal electrodes 4 on the other end surface of the laminated body 5. The materials for the external electrodes 6 and 7 include, for example, a material containing Ag or Cu as its main constituent.

Further, if necessary, a plating film, not shown, is formed on the external electrodes 6 and 7. The plating film is composed of, for example, a Ni plating film and a Sn plating film formed on the Ni plating film.

Further, the laminated ceramic capacitor 1 may be a two-terminal type capacitor including the two external electrodes 6 and 7, or may be a multi-terminal type capacitor including a larger number of external electrodes.

The dielectric layers 2 are characteristically composed of a dielectric ceramic which has a composition represented by the general formula: $100(Ba_{1-x}Ca_x)TiO_3+aAl+bV+cMg+dRe$, in which Re is at least one metal element selected from among Y, La, Sm, Eu, Gd, Tb, Dy, Ho, Er, Tm, and Yb, and the x, a, b, c, and d respectively satisfy the conditions of $0.050 \leq x \leq 0.150$, $a \geq 0.15$, $0.05 \leq b \leq 0.50$, $c \leq 0.50$, and $d \geq 1.00$.

This dielectric ceramic can reduce the variation in grain diameter. Therefore, as shown in examples to be described, even when a high electric field intensity of, for example, 15 kV/mm or more is applied while the dielectric layers 2 are reduced in thickness to about 1 μm, the laminated ceramic capacitor 1 can achieve favorable lifetime characteristics in a high temperature loading test.

In addition, c preferably satisfies the condition of c<0.10 in the dielectric ceramic. In this case, further favorable lifetime characteristics can be achieved in a high temperature loading test.

In addition, the dielectric ceramic preferably contains e parts by mol of Mn and f parts by mol of Si with respect to 100 parts by mol of the $(Ba_{1-x}Ca_x)TiO_3$, in which the a, d, e, and f respectively satisfy the conditions of $0.15 \leq a \leq 1.60$, $1.00 \leq d \leq 7.00$, $0.10 \leq e \leq 1.50$, and $0.50 \leq f \leq 2.50$, and the molar ratio of the $(Ba_{1-x}Ca_x)$ to Ti is 0.99 or more and 1.03 or less. In this case, the laminated ceramic capacitor 1 achieves a high dielectric constant, favorable temperature characteristics of capacitance, and high insulation properties.

The main component of the crystal grains is $(Ba_{1-x}Ca_x)TiO_3$. The existence form of Al, Mg, V, Re, Mn, and Si is not limited. For example, they can exist in the form of metal oxide, or a part of them can enter crystal grains.

A raw material powder for the dielectric ceramic is prepared, for example, as follows.

First, a $(Ba_{1-x}Ca_x)TiO_3$ based main constituent powder is prepared by a solid phase synthesis method. Specifically, compound powders such as oxides, carbonates, chlorides, and organic metallic compounds containing each of the constituent elements Ba, Ca, and Ti for the main constituent are mixed at a predetermined ratio and subjected to calcination. It is to be noted that a hydrothermal synthesis method, a hydrolysis method, etc. may be applied besides the solid-phase synthesis method.

On the other hand, compound powders such as oxides, carbonates, chlorides, and organic metallic compounds as accessory constituent powders are prepared, which contain each of Al, V, Mg, and Re (Re is at least one metal element selected from among Y, La, Sm, Eu, Gd, Tb, Dy, Ho, Er, Tm, and Yb), as well as, if necessary, Mn and Si. Then, these accessory constituent powders are mixed in predetermined ratios with the main constituent powder to obtain a raw material powder for the dielectric ceramic.

The laminated ceramic capacitor is manufactured, for example, as follows. The raw material powder for the dielectric ceramic, which is obtained in the way described above, is used to prepare a ceramic slurry. Then, ceramic green sheets are formed by a sheet forming method or the like. Multiple ceramic green sheets are stacked, and then subjected to pressure bonding to obtain a raw laminated body. Next, the raw laminated body is subjected to firing. In this firing step, the raw material powder for the dielectric ceramic is fired to provide dielectric layers composed of the dielectric ceramic. Then, external electrodes are formed by firing or the like on end surfaces of the laminated body.

Next, experimental examples will be described which were carried out according to the present invention.

EXPERIMENTAL EXAMPLE 1

(A) Preparation of Raw Material Powder for Dielectric Ceramic

First, respective powders of high-purity $BaCO_3$, $CaCO_3$, and $TiO_2$ were prepared as starting raw materials for the $(Ba_{1-x}Ca_x)TiO_2$ as a main constituent. The respective powders were blended so as to provide the Ca content x in the formula shown in Table 1. Further, the molar ratio of the $(Ba_{1-x}Ca_x)$ to Ti was controlled to 1.010.

Next, the blended powders were subjected to wet mixing in a ball mill disperse them uniformly, and then subjected to a drying treatment to obtain prepared powders. Then, the obtained prepared powders were subjected to calcination at a temperature of 1000° C. to 1200° C. to obtain main constituent powders.

It is to be noted that the main constituent powders had an average grain size of 0.20 μm. The average grain size was obtained by observing the powder under a scanning electron microscope, and measuring the grain sizes (equivalent circle diameters) of 300 grains.

On the other hand, respective powders of $Al_2O_3$, $V_2O_5$, MgO, and $Dy_2O_3$ as $Re_2O_3$ were prepared as accessory constituent powders. Then, the respective powders of $Al_2O_3$, $V_2O_5$, MgO, and $Dy_2O_3$ were weighed so as to provide the contents a, b, c, and d respectively in terms of the formula shown in Table 1. The accessory constituent powders were added to the main constituent powders to obtain mixed powders.

Next, the mixed powders were subjected to wet mixing in a ball mill disperse them uniformly, and then subjected to a drying treatment to obtain raw material powders for the dielectric ceramics.

(B) Preparation of Laminated Ceramic Capacitor

First, ceramic green sheets to serve as dielectric layers were formed. Specifically, the raw material powder with a polyvinyl butyral based binder, a plasticizer, and ethanol as an organic solvent added thereto was subjected to wet mixing in a ball mill to produce a slurry.

Then, this ceramic slurry was formed into sheets in accordance with the RIP method to obtain rectangular ceramic green sheets. The ceramic green sheets had a thickness of 1.5 μm.

Next, a raw laminated body was formed. Specifically, a conductive paste containing Ni as its main constituent was applied by screen printing onto the specific ceramic green sheets to form conductive paste films to serve as internal electrodes. Then, the multiple ceramic green sheets with the conductive paste films formed thereon were stacked so as to alternate the sides to which the conductive paste films were extracted, and then subjected to pressure bonding to obtain a raw laminated body.

Next, the raw laminated body was subjected to firing. Specifically, first, the raw laminated body was heated at a temperature of 350° C. for 3 hours in a reducing atmosphere to burn off the binder. Then, the laminated body was subjected to firing at a temperature of 1200° C. for 2 hours in a reducing atmosphere composed of a $H_2$—$N_2$-$H_2O$ gas with an oxygen partial pressure of $10^{-10}$ MPa.

Next, external electrodes were formed. Specifically, a Cu paste containing glass frit was applied onto end surfaces of the laminated body. Then, the Cu paste was fired by heating at a temperature of 800° C. in a nitrogen atmosphere. In this way, external electrodes were formed which were electrically connected to the internal electrodes.

The laminated ceramic capacitors were manufactured in the way described above. The laminated ceramic capacitors had external dimensions of length: 2.0 mm, width: 1.2 mm, and thickness: 1.0 mm, the number of effective dielectric layers was 5, and the area of the internal electrode opposed per dielectric layer was 1.8 mm². In addition, the dielectric layer interposed between the internal electrodes had a thickness of 1.2 μm.

(C) Characteristics Evaluation

The laminated ceramic capacitors obtained were evaluated as follows.

High Temperature Loading Test

In a high temperature loading test, the change in insulation resistance with the passage of time was measured while applying a direct-current voltage of 36 V (an electric field intensity of 30 kV/mm) at 170° C. A sample was regarded as a failure when the insulation resistance value of the sample was decreased to $10^5 \Omega$ or less, and the mean time to failure (MTTF) was obtained from a Weibull plot. The results are shown in Table 1.

TABLE 1

| Sample Number | $100(Ba_{1-x}Ca_x)_{1.010}TiO_3 + aAl + bV + cMg + dRe$ | | | | | MTTF in High Temperature Loading Test (time) |
|---|---|---|---|---|---|---|
| | x | a | b | c | d | |
| *1 | 0.02 | 0.70 | 0.10 | 0 | 4.00 | 15 |
| *2 | 0.03 | 0.70 | 0.10 | 0 | 4.00 | 21 |
| 3 | 0.05 | 0.70 | 0.10 | 0 | 4.00 | 37 |
| 4 | 0.07 | 0.70 | 0.10 | 0 | 4.00 | 39 |
| 5 | 0.10 | 0.70 | 0.10 | 0 | 4.00 | 36 |
| 6 | 0.12 | 0.70 | 0.10 | 0 | 4.00 | 34 |
| 7 | 0.15 | 0.70 | 0.10 | 0 | 4.00 | 32 |
| *8 | 0.16 | 0.70 | 0.10 | 0 | 4.00 | 20 |
| *9 | 0.07 | 0.10 | 0.03 | 0 | 4.00 | 7 |
| *10 | 0.07 | 0.15 | 0.03 | 0 | 4.00 | 14 |
| *11 | 0.07 | 0.70 | 0.03 | 0 | 4.00 | 15 |
| *12 | 0.07 | 1.60 | 0.03 | 0 | 4.00 | 16 |
| *13 | 0.07 | 0.10 | 0.05 | 0 | 4.00 | 17 |
| 14 | 0.07 | 0.15 | 0.05 | 0 | 4.00 | 43 |
| 15 | 0.07 | 0.70 | 0.05 | 0 | 4.00 | 40 |
| 16 | 0.07 | 1.60 | 0.05 | 0 | 4.00 | 37 |
| *17 | 0.07 | 0.10 | 0.10 | 0 | 4.00 | 23 |
| 18 | 0.07 | 0.15 | 0.10 | 0 | 4.00 | 36 |
| 19 | 0.07 | 1.60 | 0.10 | 0 | 4.00 | 31 |
| *20 | 0.07 | 0.10 | 0.50 | 0 | 4.00 | 19 |
| 21 | 0.07 | 0.15 | 0.50 | 0 | 4.00 | 42 |
| 22 | 0.07 | 0.70 | 0.50 | 0 | 4.00 | 46 |
| 23 | 0.07 | 1.60 | 0.50 | 0 | 4.00 | 41 |
| *24 | 0.07 | 0.10 | 0.70 | 0 | 4.00 | 15 |
| *25 | 0.07 | 0.15 | 0.70 | 0 | 4.00 | 11 |
| *26 | 0.07 | 0.70 | 0.70 | 0 | 4.00 | 9 |
| *27 | 0.07 | 1.60 | 0.70 | 0 | 4.00 | 12 |
| 28 | 0.07 | 0.70 | 0.10 | 0.05 | 4.00 | 37 |
| 29 | 0.07 | 0.70 | 0.10 | 0.09 | 4.00 | 35 |
| *30 | 0.07 | 0.70 | 0.10 | 0.70 | 4.00 | 21 |
| 31 | 0.07 | 0.15 | 0.10 | 0.20 | 4.00 | 26 |
| *32 | 0.07 | 0.15 | 0.10 | 0.70 | 4.00 | 18 |
| *33 | 0.07 | 0.10 | 0.10 | 0.50 | 4.00 | 25 |
| *34 | 0.07 | 0.10 | 0.10 | 0.70 | 4.00 | 19 |
| 35 | 0.07 | 0.70 | 0.10 | 0 | 1.00 | 35 |
| *36 | 0.07 | 0.70 | 0.10 | 0 | 0.70 | 18 |

(D) Conclusions

In Table 1, the samples without numbers marked with a symbol * refer to samples with the dielectric layers composed of a dielectric ceramic including a compound represented by the composition formula $100(Ba_{1-x}Ca_x)TiO_3+aAl+bV+cMg+dRe$, in which the Ca content x, the Al content a, the V content b, the Mg content c, and the Re content d respectively satisfy the conditions of $0.050 \leqq x \leqq 0.150$, $a \geqq 0.15$, $0.05 \leqq b \leqq 0.50$, $c \leqq 0.50$, and $d \geqq 1.00$. The samples within the ranges achieved favorable lifetime characteristics in a high temperature loading test. In addition, in the more preferable range of $c<0.10$, more favorable lifetime characteristics were achieved in the high temperature loading test.

The Al has a grain growth suppression effect. An Al content a less than 0.15 shortened the MTTF as in the case of sample numbers 9, 13, 17, 20, 24, 33, and 34.

A V content b less than 0.05 shortened the MTTF as in the case of sample numbers 9, 10, 11, and 12. On the other hand, a V content b greater than 0.50 shortened the MTTF as in the case of sample numbers 24, 25, 26, and 27. This is considered to be because the solid solubility of V in the grains was increased to develop excessive grain growth locally.

A Mg content c greater than 0.50 shortened the MTTF as in the case of sample numbers 30, 32, and 34. This is considered to be because there was segregation including Mg.

A Re content d less than 1.00 shortened the MTTF as in the case of sample number 36.

A Ca content x less than 0.050 shortened the MTTF as in the case of sample numbers 1 and 2. This is considered to be because the lattice volume was increased to interfere with the solid solubility of Al. On the other hand, a Ca content x greater than 0.150 shortened the MTTF as in the case of sample number 8. This is considered to be because the grain growth was excessively developed.

EXPERIMENTAL EXAMPLE 2

(A) Preparation of Raw Material Powder for Dielectric Ceramic

First, respective powders of high-purity $BaCO_3$, $CaCO_3$, and $TiO_2$ were prepared as starting raw materials for the $(Ba_{1-x}Ca_x)TiO_3$ as a main constituent. The respective powders were blended so as to provide the Ca content x in the formula shown in Table 2 and the molar ratio of $(Ba_{1-x}Ca_x)$ to Ti ((Ba, Ca)/Ti ratio in the table). Then, main constituent powders were obtained in accordance with the same method as in Experimental Example 1. The main constituent powders had an average grain size of 0.20

On the other hand, respective powders of $Al_2O_3$, $V_2O_5$, $Re_2O_3$, $MnCO_3$, and $SiO_2$ were prepared as accessory constituent powders. Further, as the $Re_2O_3$ powder, respective powders of $Y_2O_3$, $La_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$ were prepared to select the powders for the elements shown in the column "Re" in Table 2. Then, the respective powders of $Al_2O_3$, $V_2O_5$, $Re_2O_3$, $MnCO_3$, and $SiO_2$ were weighed so as to provide the contents a, b, d, e, and f in terms of the formula shown in Table 2. Then, the accessory constituent powders were added to the main constituent powders to obtain mixed powders.

Next, the mixed powders were subjected to wet mixing in a ball mill to uniformly disperse them, and then subjected to a drying treatment to obtain raw material powders for the dielectric ceramics.

(B) Preparation of Laminated Ceramic Capacitor

Laminated ceramic capacitors were prepared in accordance with the same method as in Experimental Example 1.

(C) Characteristics Evaluation

The laminated ceramic capacitors obtained were evaluated as follows.

Dielectric Constant

The capacitance was measured for each sample to calculate the dielectric constant. The measurement was carried out in such a way that an automatic bridge type measurement instrument was used to apply an alternate-current voltage of 1 $V_{rms}$ and 1 kHz at a temperature of 25° C. The dielectric constant $\in r$ was calculated from the obtained capacitance value, the area of the internal electrode opposed, and the thickness of the dielectric layer.

Temperature Rate of Change in Capacitance

The temperature rate of change in capacitance was measured for each sample. The measurement was carried out in such a way that the capacitance was measured while changing the temperature within the range from −55° C. to +125° C. Then, the rate of change ($\Delta C_{TC}$) for the capacitance value ($C_{TC}$) with the maximum absolute value of change was calculated in accordance with the formula $\Delta C_{TC}=((C_{TC}-C_{25})/C_{25})$ with the capacitance value ($C_{25}$) at 25° C. as a standard.

Specific Resistance

The insulation resistance was measured for each sample to calculate the specific resistance (log ρ). Specifically, the measurement was carried out in such a way that with the use of an insulation resistance meter, a direct-current voltage of 10 V was applied at a temperature of 25° C. for 120 seconds to measure the insulation resistance. Then, the specific resistance was calculated from the obtained insulation resistance value, the area of the internal electrode opposed, and the thickness of the dielectric layer.

The results are shown in Table 2.

TABLE 2

| Sample Number | 100($Ba_{1-x}Ca_x$)$TiO_3$ + aAl + bV + dRe + eMn + fSi | | | | | | | Dielectric Constant $\in r$ | Temperature Rate of Change $\Delta C_{TC}$ (%) | Specific Resistance log ρ (Ω·m) |
|---|---|---|---|---|---|---|---|---|---|---|
| | x | a | b | Re | d | e | f | (Ba, Ca)/Ti ratio | | |
| 37 | 0.07 | 0.15 | 0.10 | Dy | 4.00 | 0.70 | 1.50 | 1.010 | 2690 | −14.2 | 10.7 |
| 38 | 0.07 | 0.70 | 0.10 | Dy | 4.00 | 0.70 | 1.50 | 1.010 | 2581 | −13.0 | 10.7 |
| 39 | 0.07 | 1.60 | 0.10 | Dy | 4.00 | 0.70 | 1.50 | 1.010 | 2231 | −12.3 | 10.7 |
| Δ 40 | 0.07 | 1.80 | 0.10 | Dy | 4.00 | 0.70 | 1.50 | 1.010 | 1894 | −10.3 | 10.8 |
| 41 | 0.07 | 0.70 | 0.10 | Dy | 1.00 | 0.70 | 1.50 | 1.010 | 2544 | −14.4 | 10.8 |
| 42 | 0.07 | 0.70 | 0.10 | Dy | 7.00 | 0.70 | 1.50 | 1.010 | 2230 | −13.4 | 10.6 |
| Δ 43 | 0.07 | 0.70 | 0.10 | Dy | 8.00 | 0.70 | 1.50 | 1.010 | 1887 | −14.9 | 10.7 |
| Δ 44 | 0.07 | 0.70 | 0.10 | Dy | 4.00 | 0.08 | 1.50 | 1.010 | 2850 | −16.5 | 11.3 |
| 45 | 0.07 | 0.70 | 0.10 | Dy | 4.00 | 0.10 | 1.50 | 1.010 | 2833 | −14.2 | 11.0 |
| 46 | 0.07 | 0.70 | 0.10 | Dy | 4.00 | 1.50 | 1.50 | 1.010 | 2186 | −12.5 | 10.5 |
| Δ 47 | 0.07 | 0.70 | 0.10 | Dy | 4.00 | 1.65 | 1.50 | 1.010 | 1982 | −11.8 | 9.9 |
| Δ 48 | 0.07 | 0.70 | 0.10 | Dy | 4.00 | 0.70 | 0.30 | 1.010 | 2539 | −15.7 | 10.8 |
| 49 | 0.07 | 0.70 | 0.10 | Dy | 4.00 | 0.70 | 0.50 | 1.010 | 2677 | −14.1 | 10.9 |
| 50 | 0.07 | 0.70 | 0.10 | Dy | 4.00 | 0.70 | 2.50 | 1.010 | 2144 | −13.2 | 10.7 |
| Δ 51 | 0.07 | 0.70 | 0.10 | Dy | 4.00 | 0.70 | 2.70 | 1.010 | 1892 | −15.9 | 10.7 |
| Δ 52 | 0.07 | 0.70 | 0.10 | Dy | 4.00 | 0.70 | 1.50 | 0.987 | 2588 | −12.6 | 10.1 |
| 53 | 0.07 | 0.70 | 0.10 | Dy | 4.00 | 0.70 | 1.50 | 0.990 | 2459 | −12.3 | 10.6 |
| 54 | 0.07 | 0.70 | 0.10 | Dy | 4.00 | 0.70 | 1.50 | 1.030 | 2504 | −14.8 | 10.7 |
| Δ 55 | 0.07 | 0.70 | 0.10 | Dy | 4.00 | 0.70 | 1.50 | 1.033 | 2410 | −17.0 | 10.8 |
| 56 | 0.07 | 0.70 | 0.10 | Y | 1.00 | 0.70 | 1.50 | 1.010 | 2411 | −14.0 | 10.8 |
| 57 | 0.07 | 0.70 | 0.10 | Y | 4.00 | 0.70 | 1.50 | 1.010 | 2314 | −12.5 | 10.8 |
| 58 | 0.07 | 0.70 | 0.10 | Y | 7.00 | 0.70 | 1.50 | 1.010 | 2255 | −11.1 | 10.7 |
| 59 | 0.07 | 0.70 | 0.10 | La | 1.00 | 0.70 | 1.50 | 1.010 | 2714 | −14.7 | 10.9 |
| 60 | 0.07 | 0.70 | 0.10 | La | 4.00 | 0.70 | 1.50 | 1.010 | 2688 | −13.7 | 10.8 |
| 61 | 0.07 | 0.70 | 0.10 | La | 7.00 | 0.70 | 1.50 | 1.010 | 2581 | −13.1 | 10.8 |
| 62 | 0.07 | 0.70 | 0.10 | Sm | 1.00 | 0.70 | 1.50 | 1.010 | 2708 | −14.5 | 10.9 |
| 63 | 0.07 | 0.70 | 0.10 | Sm | 4.00 | 0.70 | 1.50 | 1.010 | 2654 | −13.8 | 10.8 |
| 64 | 0.07 | 0.70 | 0.10 | Sm | 7.00 | 0.70 | 1.50 | 1.010 | 2523 | −12.9 | 10.9 |
| 65 | 0.07 | 0.70 | 0.10 | Eu | 1.00 | 0.70 | 1.50 | 1.010 | 2696 | −14.5 | 10.8 |
| 66 | 0.07 | 0.70 | 0.10 | Eu | 4.00 | 0.70 | 1.50 | 1.010 | 2601 | −13.4 | 10.8 |
| 67 | 0.07 | 0.70 | 0.10 | Eu | 7.00 | 0.70 | 1.50 | 1.010 | 2511 | −12.6 | 10.8 |
| 68 | 0.07 | 0.70 | 0.10 | Gd | 1.00 | 0.70 | 1.50 | 1.010 | 2600 | −14.6 | 10.8 |
| 69 | 0.07 | 0.70 | 0.10 | Gd | 4.00 | 0.70 | 1.50 | 1.010 | 2556 | −13.2 | 10.8 |
| 70 | 0.07 | 0.70 | 0.10 | Gd | 7.00 | 0.70 | 1.50 | 1.010 | 2411 | −12.9 | 10.7 |
| 71 | 0.07 | 0.70 | 0.10 | Tb | 1.00 | 0.70 | 1.50 | 1.010 | 2512 | −14.0 | 10.7 |
| 72 | 0.07 | 0.70 | 0.10 | Tb | 4.00 | 0.70 | 1.50 | 1.010 | 2489 | −13.1 | 10.7 |
| 73 | 0.07 | 0.70 | 0.10 | Tb | 7.00 | 0.70 | 1.50 | 1.010 | 2305 | −12.7 | 10.7 |
| 74 | 0.07 | 0.70 | 0.10 | Ho | 1.00 | 0.70 | 1.50 | 1.010 | 2429 | −13.5 | 10.8 |
| 75 | 0.07 | 0.70 | 0.10 | Ho | 4.00 | 0.70 | 1.50 | 1.010 | 2385 | −12.0 | 10.7 |
| 76 | 0.07 | 0.70 | 0.10 | Ho | 7.00 | 0.70 | 1.50 | 1.010 | 2249 | −11.3 | 10.8 |
| 77 | 0.07 | 0.70 | 0.10 | Er | 1.00 | 0.70 | 1.50 | 1.010 | 2437 | −13.4 | 10.7 |
| 78 | 0.07 | 0.70 | 0.10 | Er | 4.00 | 0.70 | 1.50 | 1.010 | 2321 | −12.3 | 10.8 |
| 79 | 0.07 | 0.70 | 0.10 | Er | 7.00 | 0.70 | 1.50 | 1.010 | 2222 | −11.1 | 10.7 |
| 80 | 0.07 | 0.70 | 0.10 | Tm | 1.00 | 0.70 | 1.50 | 1.010 | 2420 | −12.6 | 10.8 |
| 81 | 0.07 | 0.70 | 0.10 | Tm | 4.00 | 0.70 | 1.50 | 1.010 | 2308 | −11.8 | 10.7 |
| 82 | 0.07 | 0.70 | 0.10 | Tm | 7.00 | 0.70 | 1.50 | 1.010 | 2134 | −10.8 | 10.6 |
| 83 | 0.07 | 0.70 | 0.10 | Yb | 1.00 | 0.70 | 1.50 | 1.010 | 2390 | −12.0 | 10.7 |
| 84 | 0.07 | 0.70 | 0.10 | Yb | 4.00 | 0.70 | 1.50 | 1.010 | 2249 | −10.5 | 10.6 |
| 85 | 0.07 | 0.70 | 0.10 | Yb | 7.00 | 0.70 | 1.50 | 1.010 | 2102 | −9.9 | 10.7 |

(D) Evaluations

In Table 2, the samples without sample numbers marked with a symbol refer to samples represented by the composition formula $100(Ba_{1-x}Ca_x)TiO_3+aAl+bV+dRe+eMn+fSi$, in which the Ca content x, the Al content a, the V content b, the Re content d, the Mn content e, and the Si content f respectively satisfy the conditions of $0.050 \leq x \leq 0.150$, $0.15 \leq a \leq 1.60$, $0.05 \leq b \leq 0.50$, $1.00 \leq d \leq 7.00$, $0.10 \leq e \leq 1.50$, and $0.50 \leq f \leq 2.50$, and the molar ratio of the $(Ba_{1-x}Ca_x)$ to Ti in the general formula is 0.99 or more and 1.03 or less. The samples within the ranges achieved a high dielectric constant, favorable temperature characteristics of capacitance, and high insulation properties.

An Al content a greater than 1.60 decreased the dielectric constant as in the case of sample number 40.

A Re content d greater than 7.00 decreased the dielectric constant as in the case of sample number 43.

A Mn content e less than 0.10 increased the temperature rate of change as in the case of sample number 44. In addition, a Mn content e greater than 1.50 decreased the dielectric constant as in the case of sample number 47.

A Si content f less than 0.50 increased the temperature rate of change as in the case of sample number 48. In addition, a Si content f greater than 2.50 increased the temperature rate of change as in the case of sample number 51.

A molar ratio of the $(Ba_{1-x}Ca_x)$ to Ti less than 0.99 decreased the specific resistance as in the case of sample number 52. In addition, a molar ratio of the $(Ba_{1-x})$ to Ti greater than 1.03 increased the temperature rate of change as in the case of sample number 55.

What is claimed is:

1. A dielectric ceramic comprising $(Ba_{1-x}Ca_x)TiO_3$ as its main constituent, and with respect to 100 parts by mol of the $(Ba_{1-x}Ca_x)TiO_3$, a parts by mol of Al, b parts by mol of V, c parts by mol of Mg, and d parts by mol of Re,
    wherein Re is at least one metal element selected from the group consisting of Y, La, Sm, Eu, Gd, Tb, Dy, Ho, Er, Tm, and Yb, $0.050 \leq x \leq 0.150$, $a \geq 0.15$, $0.05 \leq b \leq 0.50$, $c \leq 0.50$, and $d \geq 1.00$.

2. The dielectric ceramic according to claim 1, wherein $c < 0.10$.

3. The dielectric ceramic according to claim 2, further comprising with respect to 100 parts by mol of the $(Ba_{1-x}Ca_x)TiO_3$, e parts by mol of Mn and f parts by mol of Si, wherein $0.15 \leq a \leq 1.60$, $1.00 \leq d \leq 7.00$, $0.10 \leq e \leq 1.50$, and $0.50 \leq f \leq 2.50$, and the molar ratio of the $(Ba_{1-x}Ca_x)$ to Ti is 0.99 to 1.03.

4. The dielectric ceramic according to claim 3, wherein $0.7 \leq a$, $4.00 \leq d$, $0.7 \leq e$, and $f \leq 1.50$, and the molar ratio of the $(Ba_{1-x}Ca_x)$ to Ti is 1.00 to 1.03.

5. The dielectric ceramic according to claim 4, wherein Re is Dy.

6. The dielectric ceramic according to claim 1, further comprising with respect to 100 parts by mol of the $(Ba_{1-x}Ca_x)TiO_3$, e parts by mol of Mn and f parts by mol of Si, wherein $0.15 \leq a \leq 1.60$, $1.00 \leq d \leq 7.00$, $0.10 \leq e \leq 1.50$, and $0.50 \leq f \leq 2.50$, and the molar ratio of the $(Ba_{1-x}Ca_x)$ to Ti is 0.99 to 1.03.

7. The dielectric ceramic according to claim 6, wherein $0.7 \leq a$, $4.00 \leq d$, $0.7 \leq e$, and $f \leq 1.50$, and the molar ratio of the $(Ba_{1-x}Ca_x)$ to Ti is 1.00 to 1.03.

8. The dielectric ceramic according to claim 7, wherein Re is Dy.

9. The dielectric ceramic according to claim 1, wherein $0.07 \leq x \leq 0.12$, $0.7 \leq a \leq 1.60$, $0.1 \leq b$, $c \leq 0.2$, and $d \leq 7.0$ 1.00.

10. The dielectric ceramic according to claim 9, wherein Re is Dy.

11. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 10.

12. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 9.

13. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 8.

14. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 7.

15. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 6.

16. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 5.

17. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein
    the dielectric layers comprise the dielectric ceramic according to claim 4.

18. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein the dielectric layers comprise the dielectric ceramic according to claim 3.

19. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein the dielectric layers comprise the dielectric ceramic according to claim 2.

20. A laminated ceramic capacitor comprising a laminated body comprising a plurality of stacked dielectric layers and a plurality of internal electrodes disposed at different interfaces between the dielectric layers; and a pair of external electrodes disposed on an outer surface of the laminated body and each of which is electrically connected to a different internal electrode, wherein the dielectric layers comprise the dielectric ceramic according to claim 1.

* * * * *